July 17, 1956      D. J. KIPP      2,754,682

INSTRUMENTS FOR MEASURING TORQUE

Filed Aug. 10, 1953      3 Sheets-Sheet 1

DAVID J. KIPP
*INVENTOR.*

BY

HIS ATTORNEY

July 17, 1956  D. J. KIPP  2,754,682
INSTRUMENTS FOR MEASURING TORQUE
Filed Aug. 10, 1953  3 Sheets-Sheet 2

DAVID J. KIPP
*INVENTOR.*

BY
HIS ATTORNEY

July 17, 1956 D. J. KIPP 2,754,682
INSTRUMENTS FOR MEASURING TORQUE
Filed Aug. 10, 1953 3 Sheets-Sheet 3

DAVID J. KIPP
*INVENTOR.*

BY

HIS ATTORNEY

United States Patent Office 2,754,682
Patented July 17, 1956

2,754,682
INSTRUMENTS FOR MEASURING TORQUE

David J. Kipp, Pasadena, Calif., assignor to Hoffman Electronics Corporation, a corporation of California Application August 10, 1953, Serial No. 373,147

3 Claims. (Cl. 73—136)

This invention is related, in general, to mechanical measuring instruments and more particularly, to an improved instrument for measuring torque.

In the manufacture of apparatus containing shafts which are to be rotated it is often desirable to be able to measure the torque required to rotate such shafts. For example, in the manufacture of electronic equipment dial shafts are often incorporated in such equipment, and, where such apparatus is of a military nature, strict limits on the amount of torque required to rotate such shafts may be imposed. The apparatus available for measuring such torque in the past has been complex in structure and difficult in operation. It has often required semi-skilled labor to perform the testing operations on the shafts and other mechanical apparatus in which the operating torque is in question. Obviously, it is desirable to reduce the complexity and improve the accuracy of such apparatus so that that phase of the testing of apparatus incorporating shafts can be performed by unskilled personnel, without jeopardizing the performance of the final product.

Therefore, it is an object of this invention to provide an improved and simplified torque indicating instrument.

It is a further object of this invention to provide a simplified go-and-no-go torque gauge.

It is a still further object of this invention to provide an improved and simplified direct reading torque meter.

In accordance with the present invention a differential gear train is interposed between the driving and driven shafts. This differential gear assembly carries a balance arm and has weights spaced from the axis of such shafts predetermined distances. The predetermined weights may be spaced symmetrically opposite the central shafts to provide bi-directional torque measurement.

The features of the present invention which are believed to be novel are set forth with particularity in the appended claims. The present invention itself, both as to its organization and manner of operation, together with further objects and advantages thereof, may best be understood by reference to the following description, taken in connection with the accompanying drawings, in which:

Figure 1:
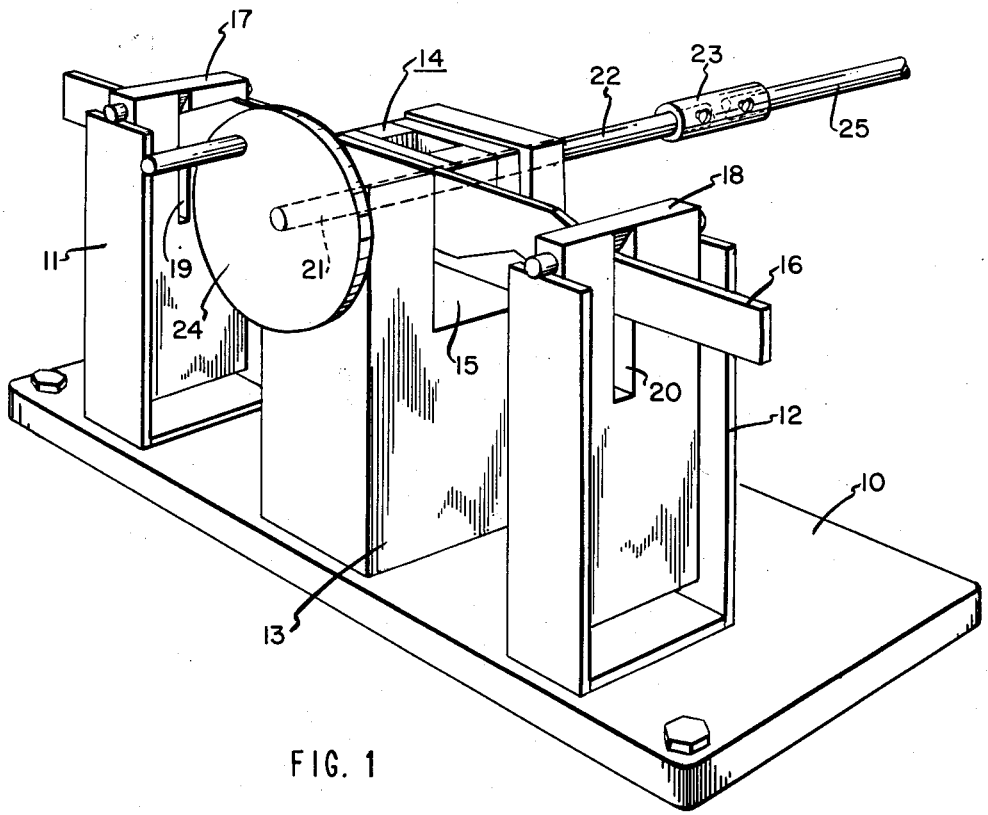
Figure 1 is a perspective view of one embodiment of my invention.

In Figure 1, base 10 carries outer standards 11 and 12 and central standard 13. Differential gear box 14 is supported in cutout 15 of central standard 13 and is affixed to balance arm 16. The method of supporting differential gear box 14 is shown more clearly in Figure 2. In the static condition weights 17 and 18 rest upon outer standards 11 and 12, respectively. Opposite ends of balance arm 16 pass through apertures 19 and 20 of predetermined weights 17 and 18, respectively, the upper extremities of these apertures 19 and 20 being in the form of knife edges. Shafts 21 and 22 are connected to differential gear box 14. Coupler 23 may be provided on shaft 22 so that the torque required to rotate a shaft to be tested may be determined. Shaft 21 is connected to handle 24.

Figure 2:
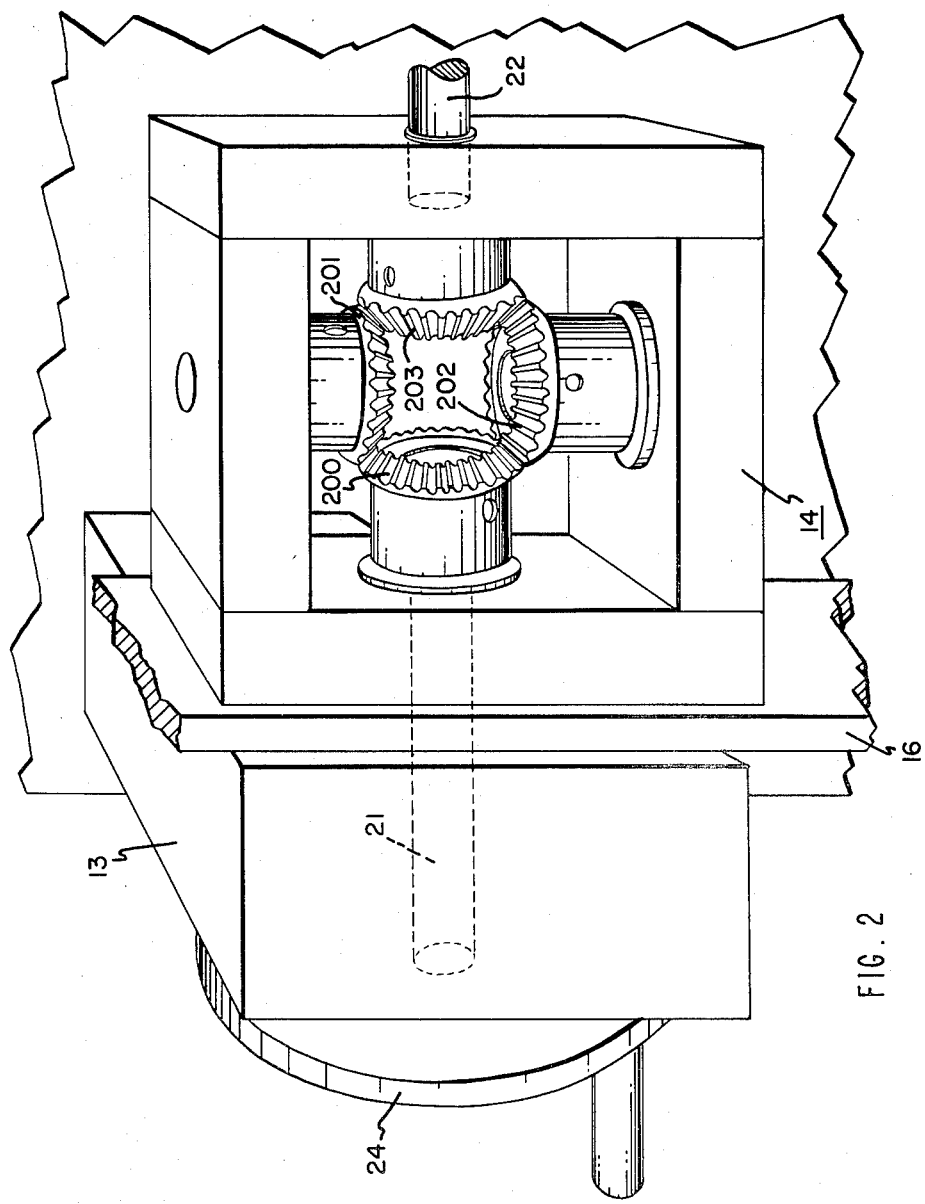
Figure 2 is an expanded view of a portion of the torque measuring device according to my invention.

In Figure 2, shaft 21 terminates in bevel gear 200 which meshes with bevel gears 201 and 202, both of which are appropriately carried on bearings supported in differential gear box 14. Shaft 22, which connects to the shaft to be tested, terminates in bevel gear 203 which meshes with bevel gears 201 and 202. Shaft 22 like shaft 21 is appropriately carried on bearings supported in differential gear box 14. Gears 200, 201, 202 and 203 are designed and assembled to exhibit a minimum amount of friction.

Figure 3:
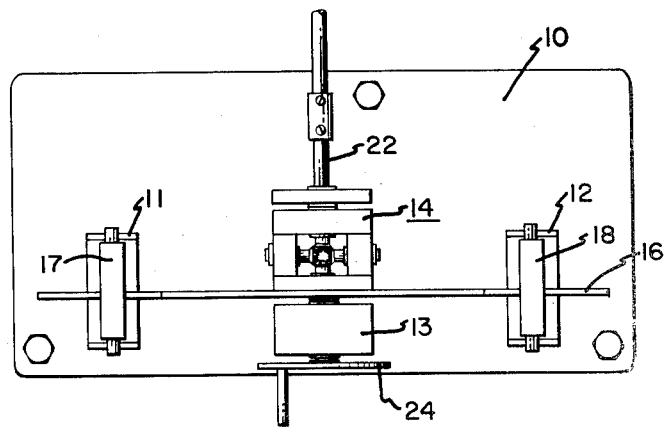
Figure 3 is a top plan view of a torque measuring device according to my invention.

A few additional details are provided by Figure 3 and the elements of the structure of Figure 3 are assigned the numbers previously given them in connection with Figures 1 and 2.

The operation of the torque measuring device disclosed in Figures 1, 2 and 3 is as follows: The shaft to be torque-tested is coupled to shaft 22 through coupler 23. Weights 17 and 18 having known values are placed on balance arm 16 at predetermined distances, respectively, from the axes of shafts 21 and 22 so that the upper limit of allowable torque required to rotate the test shaft 25 will lift either of the weights 17 or 18 as placed on balance arm 16. For example, if the maximum permissible torque to rotate test shaft 25 is 1 inch pound, weights 17 and 18 may each have a weight of ½ pound and may be spaced from the axes of shafts 21 and 22, 4 inches, a reduction of 2 to 1 being effected by the gear train.

After the weights are in position and the test shaft is connected, handle 24 is rotated, which results in a rotation of bevel gear 200 and, if the torque required to turn test shaft 25 is less than a predetermined maximum amount, bevel gears 201 and 202 will rotate causing rotation of bevel gear 203 and test shaft 25 will rotate freely without any tipping of balance arm 16. However, if the torque required to rotate test shaft 25 exceeds the predetermined maximum, it will remain substantially static and balance arm 16 will be caused to rock in a direction corresponding to the direction of rotation of handle 24 with a resultant raising of either weight 17 or weight 18. Obviously, dissimilar weights may be placed on the balance arm 16 or the distances from the axes of shafts 21 and 22 may be varied if it is desired that the test shaft have a different required torque for rotation in opposite directions.

In mass production torque testing of shafts and their associated assemblies it is obvious that they may be simply and rapidly connected to this torque measuring instrument for a go-or-no-go indication and the operator need not be skilled but need only rotate handle 24 and observe whether there is any tipping of balance arm 16.

Figure 4:
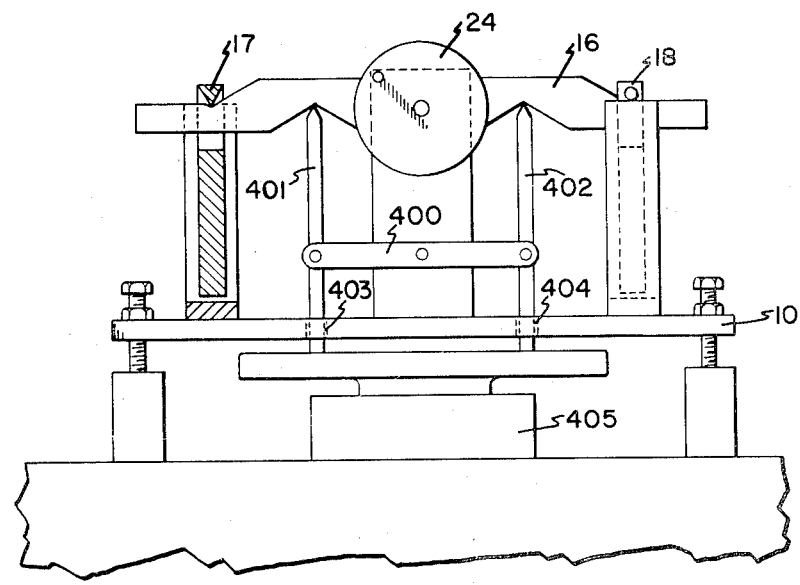
Figure 4 is an elevation view of a second embodiment of my invention.

In Figure 4, the structure of Figures 1 through 3 has been modified to permit direct reading of externally generated torques applied to the instrument. Cross-bar 400 is centrally pivoted to central standard 13 and carries equi-distant from its pivot two pressure arms 401 and 402 which at their upper extremities engage balance arm 16. Lower portions of arms 401 and 402 pass through apertures 403 and 404 in base 10 and the lower extremities engage platform scale 405 which may be directly calibrated in foot pounds or other torque units. When the instrument is to be used as a direct reading instrument for torque, handle 24 must be secured against rotation so that, in turn, bevel gear 200 remains fixed or is subjected to a braking force as torque is applied to shaft 22 from an external source to be measured. Weights 17 and 18 must be removed during this operation. Because the distance from the axis of shaft 22 to the point of engagement between either arm 401 or 402 with balance arm 16 is known, the direct reading of torque in foot pounds or inch ounces may be accomplished with a simple platform scale.

It may be seen from the foregoing description that there has been provided a simple yet accurate torque measuring device which may be utilized to determine the torque required to rotate a shaft to be tested, or which, with slight modifications, may be used to read directly the static torque produced by a source of force. In the first application the device serves as a simple go or no-go gauge and in the second case as a direct reading torque meter.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A torque measuring instrument including a driving shaft, a driven shaft and a differential gear train interposed therebetween, means for coupling said driven shaft to a load to be tested, means to rotate said driving shaft, a housing for said gear train pivotally connected to said driving and driven shafts, a balance arm affixed to said housing, a pair of weights of predetermined magnitude supported at predetermined distances from the axes of said driving and driven shafts and positioned to be engaged by said balance arm alternately on movement of said balance arm in each of two directions.

2. A torque measuring instrument including a driving shaft, a driven shaft and a differential gear train interposed therebetween, means for coupling said driven shaft to a load to be tested, means to rotate said driving shaft, a housing for said gear train pivotally connected to said driving and driven shafts, a balance arm affixed to said housing, a pair of weights of predetermined magnitude having an aperture therein to receive said balance arm, supported at predetermined distances from the axes of said driving and driven shafts with the balance arm cooperating with each of said apertures whereby upon motion of said balance arm in a first direction one of said weights is engaged and upon rotation in the other direction the other of said weights is engaged.

3. A torque measuring instrument including a driving shaft, a driven shaft and a differential gear train interposed therebetween, said driving and driven shafts being coaxial, a housing for said gear train, said shafts being rotatably supported therein and each carrying a bevel gear at its end within said housing, a second pair of shafts lying along an axis normal to that of said driving and driven shafts, rotatably supported in said housing and each carrying at its end internal to said housing a bevel gear, said second pair of shafts being positioned with the associated bevel gears in operative engagement with the bevel gears supported on said driving and driven shafts, a standard, said driving shaft being rotatably supported therein and extending therethrough, an arm affixed to said housing, and a weight of predetermined magnitude supported at a predetermined distance from the common axis of said driving and driven shafts and positioned to be engaged by said arm upon movement thereof, in one of two directions.

References Cited in the file of this patent

UNITED STATES PATENTS

| | | |
|---|---|---|
| 1,557,956 | Zubaty | Oct. 20, 1925 |
| 1,958,390 | Graham | May 8, 1934 |
| 2,079,751 | Tilden | May 11, 1937 |
| 2,511,674 | Martin | June 13, 1950 |
| 2,550,693 | Hart | May 1, 1951 |